No. 661,534. Patented Nov. 13, 1900.
A. G. HOHENSTEIN.
STEAM BOILER.
(Application filed July 30, 1900.)

(No Model.) 5 Sheets—Sheet 1.

WITNESSES:

INVENTOR

No. 661,534. Patented Nov. 13, 1900.
A. G. HOHENSTEIN.
STEAM BOILER.
(Application filed July 30, 1900.)

(No Model.) 5 Sheets—Sheet 4.

WITNESSES:
Herbert Bradley.
P. E. Gaither.

INVENTOR
Archie G. Hohenstein
by Dannis S. Wolcott Att'y.

THE NORRIS PETERS CO., PHOTO-LITHO., WASHINGTON, D. C.

No. 661,534. Patented Nov. 13, 1900.
A. G. HOHENSTEIN.
STEAM BOILER.
(Application filed July 30, 1900.)
(No Model.) 5 Sheets—Sheet 5.
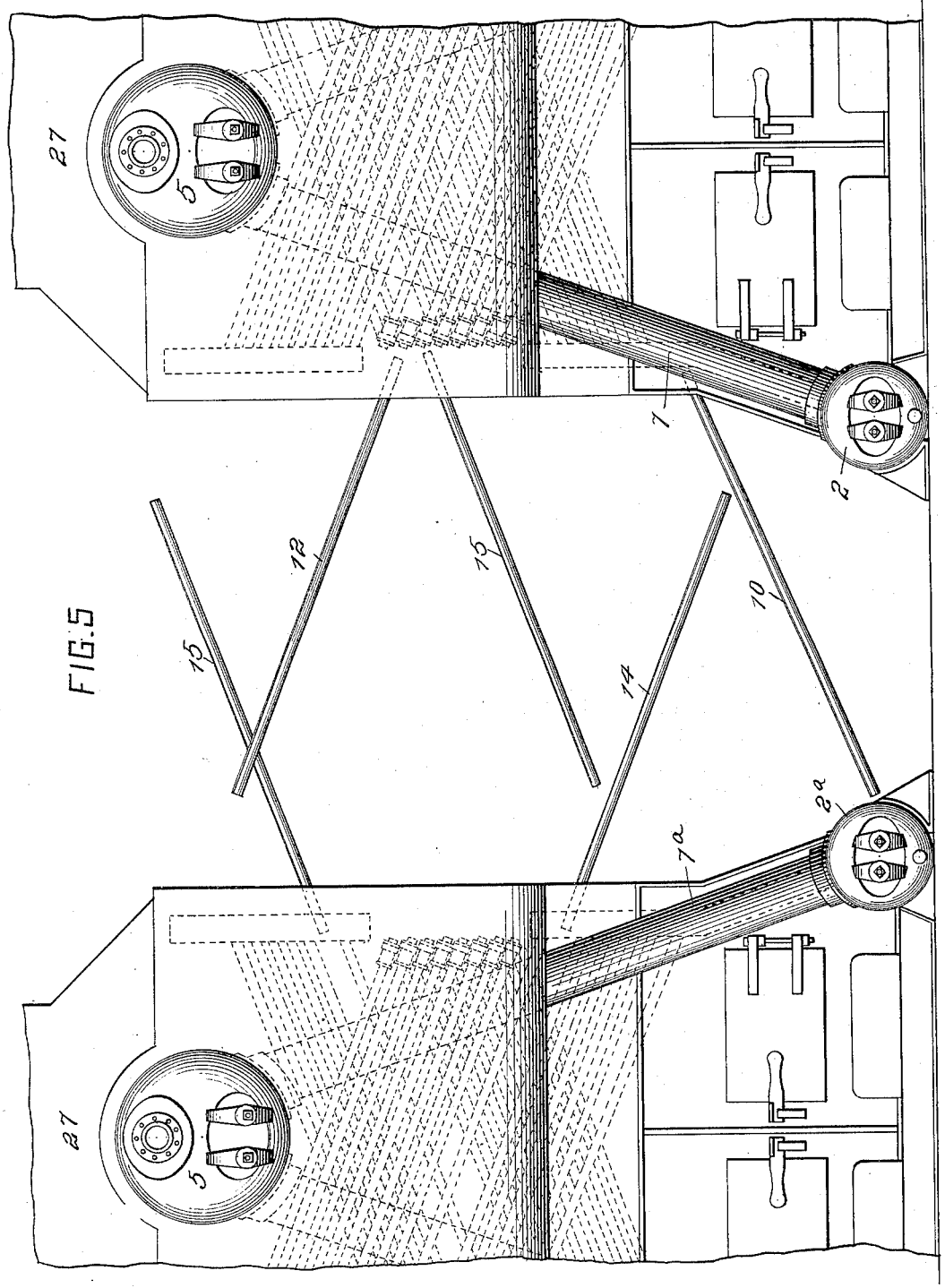
WITNESSES:
INVENTOR
Archie G. Hohenstein
by Dennis S. Wolcott Att'y.

UNITED STATES PATENT OFFICE.

ARCHIE G. HOHENSTEIN, OF NEW HAVEN, CONNECTICUT.

STEAM-BOILER.

SPECIFICATION forming part of Letters Patent No. 661,534, dated November 13, 1900.

Application filed July 30, 1900. Serial No. 25,268. (No model.)

*To all whom it may concern:*

Be it known that I, ARCHIE G. HOHENSTEIN, a citizen of the United States, residing at New Haven, in the county of New Haven and State of Connecticut, have invented or discovered certain new and useful Improvements in Steam-Boilers, of which improvements the following is a specification.

The invention described herein relates to certain improvements in the class or type of boilers forming the subject-matter of applications, Serial No. 698,966, filed December 12, 1898, and Serial Nos. 5,437, 5,438, 5,439, and 5,440, filed February 16, 1900; and the invention has for its object a construction of that class or type of boilers whereby the same is more especially adapted for use in marine service, and especially for vessels of the destroyer class, where the boiler-space is limited.

The invention is hereinafter more fully described and claimed.

Figure 1:
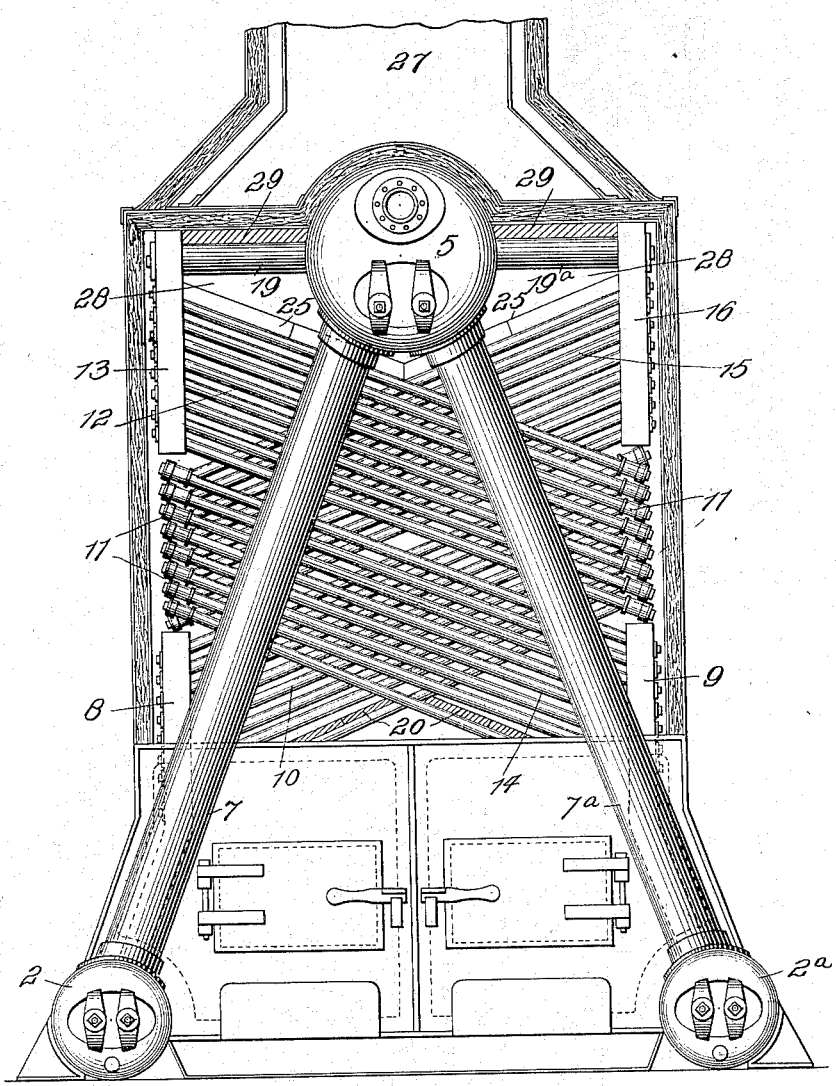
Figure 2:
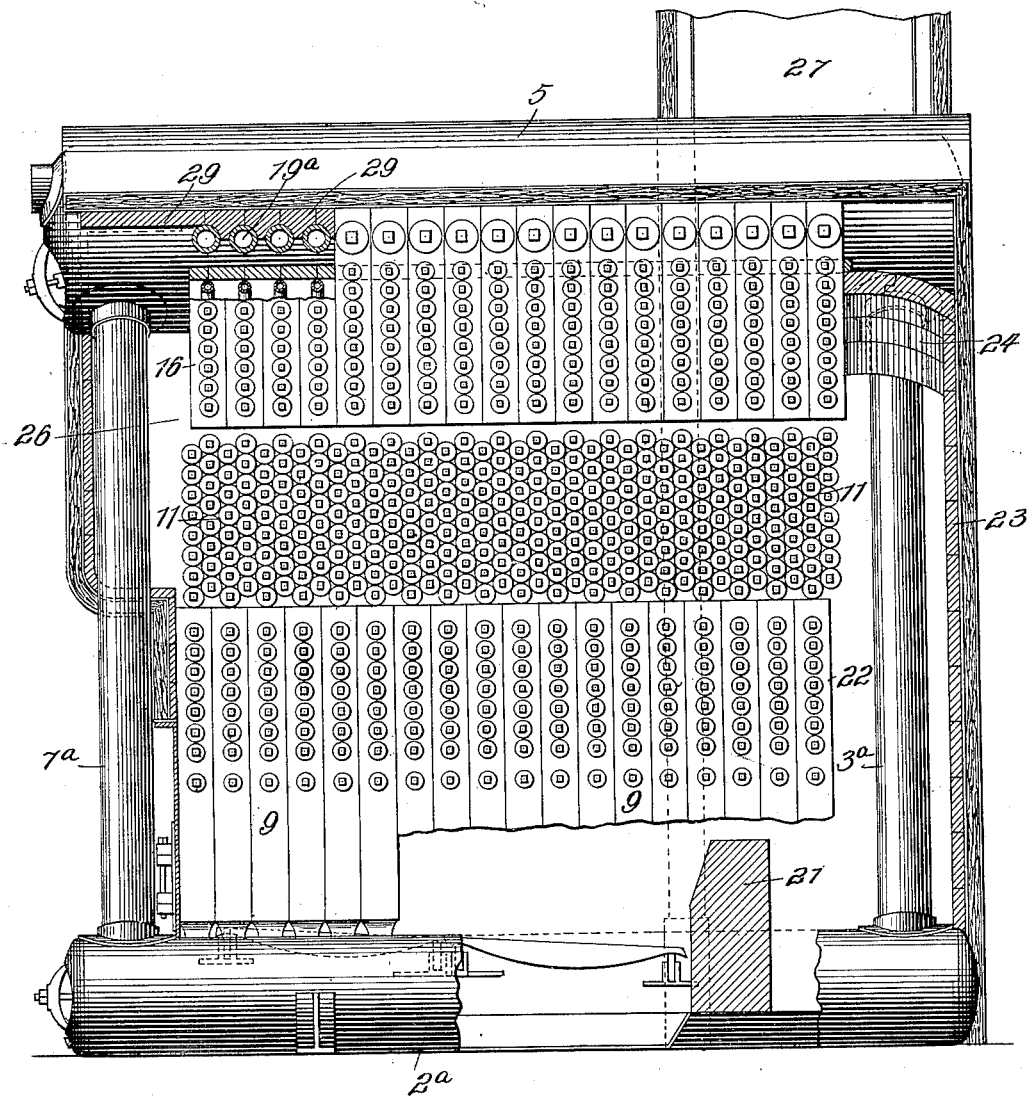
Figure 3:
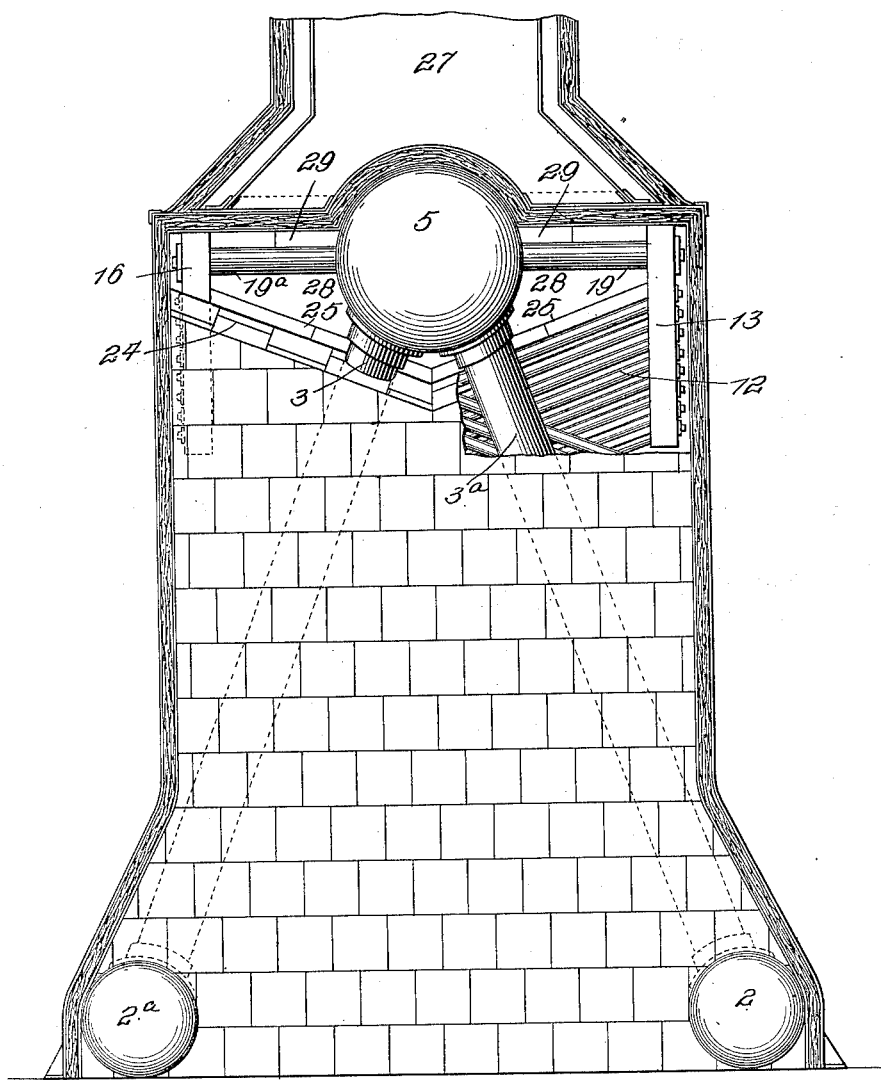
Figure 4:
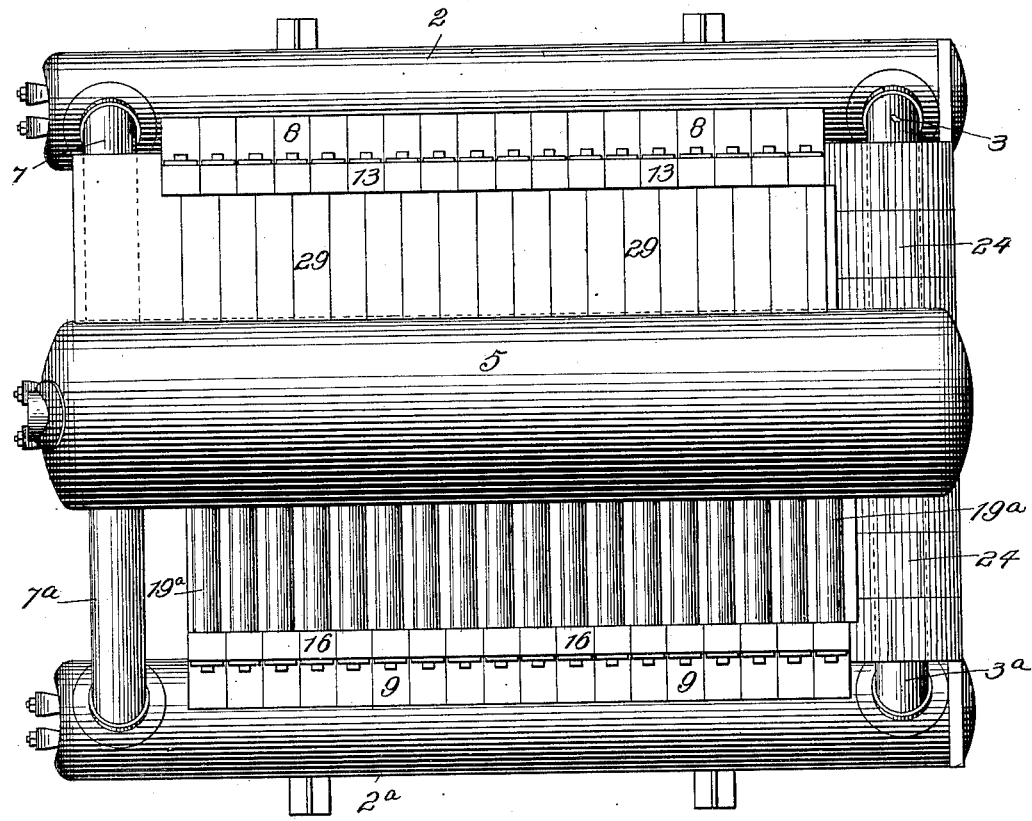
Figure 6:

In the accompanying drawings, forming a part of this specification, Figure 1 is a front elevation of my improved boiler, a portion of the front casing being removed. Fig. 2 is a view, partly in side elevation and partly in section, of the boiler, the side casing being removed. Fig. 3 is a rear elevation of the boiler, a portion of the casing at the upper end of the boiler being removed. Fig. 4 is a top plan view, the top casing and the tile on one side of the drum being removed. Fig. 5 is a diagrammatic view illustrating the arrangement of boilers with reference to the removal of tubes, and Fig. 6 is a detail view of one of the lower headers.

In the practice of my invention tubular supporting-columns 3 3$^a$ and 7 7$^a$, a pair at each end of the boiler, have their lower ends connected to the front and rear ends of the drums 2 and 2$^a$. These tubular columns are secured to the drums 2 and 2$^a$ in such manner that the members of each pair incline toward each other, and the converging upper ends are connected to the upper drum 5 at points adjacent to the front and rear ends thereof and serve as supports for the drum 5 and the parts connected thereto. Two series of headers 8 and 9 are secured to the drums 2 and 2$^a$, a series to each drum, at points intermediate of the tubular columns or downtakes. As clearly shown in Fig. 2, these headers are arranged closely adjacent to each other, so as to form practically continuous or uninterrupted side walls for the sides of the fire-box. To the headers 8 are secured a bank or series of tubes 10, which extend with an upward inclination to the opposite side of the boiler, where they are connected, by means of return-bends 11, to a bank or series of tubes 12, extending with an upward inclination across the boiler to headers 13, arranged above and approximately in line with the upper portions of the upper headers 8. A bank or series of tubes 14, similar to the bank 10, extends from the upper portions of the headers 9 to points intermediate of the headers 8 and 13, where they are connected, by means of return-bends 11, to a bank or series of tubes 15, similar to the bank 12, said tubes extending across the furnace and being connected to upper headers 16, arranged above and approximately in line with the upper portions of the lower headers 9. The series of upper headers 13 and 16 are connected by series of tubes 19 and 19$^a$, extending in horizontally from the headers to the drum 5.

The main fire-chamber is formed by arranging a series of tiles 20 upon the lower tubes of the banks or series 10 and 14, said tiles extending back to or past the bridge-wall 21 or to a vertical plane parallel with and adjacent to the rear headers of the series 8 and 9. The products of combustion pass rearwardly over the bridge-wall to the flue 22 between the rear casing-wall 23, which is preferably formed by tiles, and the rear sides of the upper and lower headers and the banks of tubes. This flue or passage 22 is closed by an arch 24, resting at its edges on the rear wall 23 and on tubes of the series 12 and 15, near the tops of said series, as shown in Figs. 2 and 3. By reason of the closure of the upper end of this flue or passage the products of combustion are caused to flow forward between the tubes forming the banks or sets 10, 14, 12, and 15 to the front of the boiler. The lower wall of this heating-chamber is formed by the tiles 20 and the upper wall by tiles 25, arranged on top of the upper tubes of the series 12 and 15. From the flue 26 at the front end of the boiler the products of combustion flow rearwardly over the tiles 25 to the stack 27 at the rear of the boiler through passages 28 formed by the sides of the drum 5, tiles 25, and tubes 19 and 19ª, on which are placed a series of protecting-tiles 29.

The inverted-V-shaped arrangement of the drums 2, 2ª, and 5, with the connecting columns or downtakes 3 3ª and 7 7ª, forms a very stable structure. The drums 2 and 2ª, which form a broad foundation for the boiler structure, are held as against any lateral spreading or separation by shoes 30, secured in any suitable manner to the deck of the vessel or other suitable foundation.

The boilers are usually arranged in pairs athwart the vessel, the number of pairs being dependent upon the beam of the vessel. In Fig. 5 I have shown two boilers arranged on opposite sides of the keel of the vessel. When using the form of boiler shown in application Serial No. 25,267, filed of even date herewith, the boilers must be arranged a distance apart a little greater than the lengths of the tubes, so as to permit of their removal through the sides of the furnace. In order to economize floor-space without reducing grate area or heating-surface and at the same time permit of the removal of the tubes, the lower headers 8 and 9 have their lower ends bent, as shown in Figs. 1 and 6, so that they incline inwardly from the drums. This inshoot of the headers will permit of the lower ends of the boilers being placed comparatively close to each other and at the same time allow of the removal of the tubes. This construction necessarily involves the use of shorter tubes; but such loss of heating-surface is compensated for by making the tubes somewhat smaller and using a larger number of tubes.

I claim herein as my invention—

1. In a steam-boiler, the combination of two lower drums, an intermediate upper drum, two pairs of tubular columns connecting the lower drums to the upper drum, two series of headers connected to the lower drums and arranged in such proximity to each other as to form practically continuous side walls for the fire-box, two series of headers connected to the upper drum, and two diverging banks of tubes connecting each series of upper headers with the corresponding series of lower headers, substantially as set forth.

2. In a steam-boiler, the combination of two lower drums, an intermediate upper drum, two pairs of tubular columns connecting the lower drums to the upper drum, two series of lower headers having their lower portions outwardly inclined and connected to the lower drums, two upper headers connected to opposite sides of the upper drum, and two diverging banks of tubes connecting each series of upper headers to the upper portions of the corresponding series of lower headers, substantially as set forth.

In testimony whereof I have hereunto set my hand.

ARCHIE G. HOHENSTEIN.

Witnesses:
DARWIN S. WOLCOTT,
F. E. GAITHER.